Feb. 10, 1942.        C. PAULSON              2,272,921
               TENSION MEASURING APPARATUS
                   Filed Oct. 7, 1939
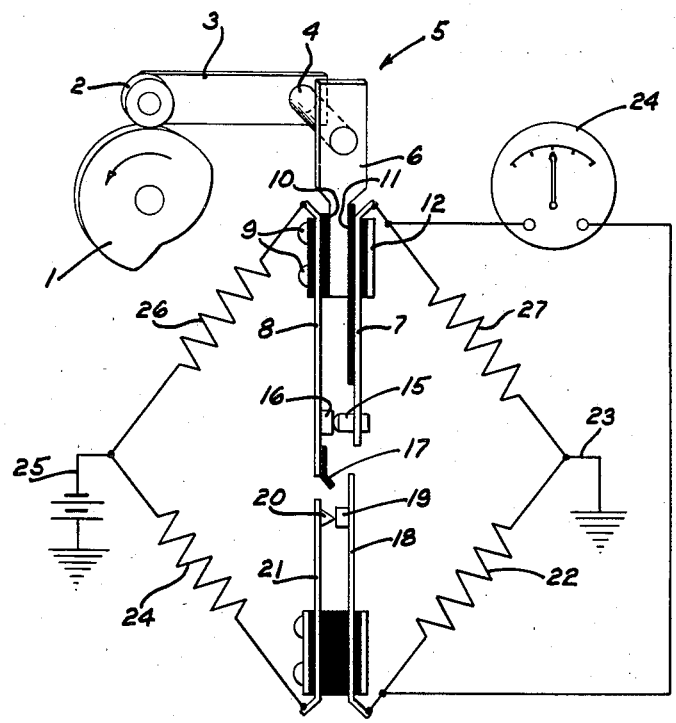
INVENTOR
C. PAULSON
BY Emery Robinson.
        ATTORNEY Patented Feb. 10, 1942

2,272,921

UNITED STATES PATENT OFFICE 2,272,921

TENSION MEASURING APPARATUS

Christian Paulson, Elmhurst, Ill., assignor to Western Electric Company, Incorporated, New York, N. Y., a corporation of New York Application October 7, 1939, Serial No. 298,409

6 Claims. (Cl. 73—51)

This invention relates to tension measuring apparatus and more particularly to an electrical tension measuring apparatus for indicating the tension of contact springs relative to a standard during their adjustment for tension.

It is an object of the present invention to provide an apparatus for indicating quickly and accurately the relative tension of contact springs.

In accordance with one embodiment of the invention, a pair of contact springs, one of which is being manually adjusted for the desired tension so that it will engage the other under a desired pressure, are each connected to an arm of a resistance bridge, the other two arms of which are connected to a pair of gage springs which have contacts thereon in engagement under the desired pressure. The four resistances in the bridge circuit are of equal value and the contacts in their inoperative position form the opposite points of a bridge circuit across which a milli-ammeter is connected. A low voltage battery is connected to the other points of the bridge circuit and the gage contact is oscillated under the influence of a motor driven cam to move it to a position where a gage point, carried by the gage spring, will engage the contact spring under test, whereby the milli-ammeter will indicate, by its direction and amount of inflection, the proportional strength of the contact spring under test and the gage spring.

A better understanding of the invention may be had by reference to the accompanying drawing when considered in conjunction with the following detailed description, the single figure of the drawing showing, schematically, an apparatus embodying the features of the invention.

Referring to the drawing, a motor driven cam 1, which may be driven from any suitable source of power, not shown, has a formation such that it will impart an oscillating movement to a cam roller 2 associated with it. The cam roller 2 is mounted upon a cam arm 3 fixed to a rock shaft 4, on which there is also mounted a gage spring assembly, designated generally by the numeral 5, and including a lever 6 having a contact carrying arm 7 and a gage spring 8 insulatedly mounted thereon by means of screws 9, insulators 10 and 11 and a threaded block 12. The insulator 11 serves as a stiffening member for the contact supporting arm 7, which carries adjacent its lower extremity a contact 15. The gage spring 8 has mounted upon it a contact 16 which it urges into engagement with the contact 15 at the pressure which the spring under test should urge its contact into engagement with its associated contact, the gage spring 8 comprising the standard with which a spring under test will be compared. Mounted upon the lower end of the gage spring 8 is a gage point 17 of insulating material adapted to engage the extending end of a contact sprin 18 under test. The contact spring 18 normally urges a contact 19 carried by it into engagement with a contact 20 mounted upon a relatively stiff contact spring 21 and the contact springs 18 and 21 are insulated one from another in a manner similar to that described in connection with the contact supporting arm 7 and the gage spring 8.

The terminal end of the contact spring 18 under test is connected through a resistance 22 to ground at 23, and to one side of a milli-ammeter 24, the relatively stiff contact spring 21 has its terminal end connected through a resistance 24 to grounded battery at 25, which grounded battery is also connected through a resistance 26 to the terminal end of the gage spring 8, and the ground at 23 is connected through a resistance 27 to the terminal end of the contact supporting arm 7 and to the other side of the milli-ammeter. The resistances 22, 24, 26 and 27 may be of any suitable value so long as they are all equal and they and the power source indicated at the battery 25 may be chosen to suit the particular milli-ammeter selected for use so that the milli-ammeter will not be damaged in moving beyond its normal full scale movement upon the breaking of contact between either contacts 15 and 16 or contacts 19 and 20. A milli-ammeter should be chosen which takes approximately the same length of time to go from zero to full scale deflection under the influence of the chosen battery and resistances as it takes the gage spring 8 to oscillate through one cycle.

In the operation of the device, which is designed for use by an operator adjusting contact spring 18 so that it will cause its contact 19 to engage the contact 20 under a desired tension, the motor driven cam 1 will cause the gage spring assembly 5 to be repeatedly oscillated and to intermittently carry the gage point 17 into engagement with the extending end of the contact spring 18 under test to thus open the circuit between contacts 15 and 16 and contacts 19 and 20. If, in the oscillation of the gage spring assembly 5, the contacts 15 and 16 and 19 and 20 open at the same instant, thereby indicating that the tension in the gage spring 8 and the tension in the spring 18 under test are the same, no current will flow through the milli-ammeter 24 and, therefore, its pointer will remain stationary.

However, should the spring 18 under test be weaker or stronger than the gage spring 8, the pairs of contacts will not open at the same instant, thus permitting current to flow through the meter in one direction or the other, depending upon which pair of contacts 15 and 16 or 19 and 20 open first. Since the time interval between the opening of the contacts is proportional to the difference in tension between the gage spring 8 and the spring 18 under test, the deflection of the meter pointer will be proportional to the difference in tension of the two springs and if the gage spring 8 is stronger than the spring 18, the meter pointer will deflect in one direction whereas if the gage spring 8 is weaker than the spring 18 under test, the meter pointer will be deflected in the opposite direction. Thus, an operator, by watching the milli-ammeter, may adjust the tension in the contact spring 18 until the meter pointer remains stationary.

Although a specific embodiment of the invention has been described hereinbefore, it will be understood that numerous modifications thereof may be made without departing from the scope of the invention, which is to be limited only by the appended claims.

What is claimed is:

1. An apparatus for determining the relative tension of a contact spring with respect to a standard gage spring including a normally balanced bridge circuit, a milli-ammeter connected to two opposed points of said bridge circuit, a power source connected across the other two points of said bridge circuit, a gage spring completing the bridge circuit at one point on the bridge, means for connecting the contact spring under test to the bridge circuit to complete the bridge circuit at the opposite point, and means for moving the gage spring to open the circuit at the contact spring under test.

2. In a device for determining the relative tension under which a contact spring forces its contact into engagement with an associated contact, a bridge circuit including a source of potential, a gage spring having a known tension for completing said bridge circuit, means for connecting the contact spring under test in the bridge circuit, means for transmitting pressure through the gage spring to the spring under test to open the bridge circuit at the spring under test or the gage spring and thereby unbalance it in either of two opposite directions, and means whereby the direction of unbalance of the bridge circuit indicates whether the contact spring under test is stronger or weaker than the gage spring.

3. In an apparatus for determining the relative strength of a contact spring with respect to a gage spring, a bridge circuit, a milli-ammeter connected across the bridge circuit, a source of potential applied to said bridge circuit, a gage spring actuated contact bar for completing one arm of said bridge circuit, means for completing another arm of said bridge circuit through the spring being tested, means for applying pressure through the gage spring to the contact spring under test to open the bridge circuit at either the gage spring or contact spring under test and thereby unbalance the bridge circuit if the gage spring and contact spring are not equally strong whereby the amount of deflection of the milli-ammeter pointer indicates the relative strength of the spring under test with respect to the gage spring.

4. In an apparatus for measuring the relative tension of a contact spring with respect to a gage spring during adjustment of the contact spring comprising means for applying a predetermined pressure to the spring under test including a pair of contacts held closed under a predetermined tension, a bridge circuit having adjacent arms connected to said contacts, means for connecting the spring under test to one opposed arm of said bridge, means contacting said spring under test and connected to the other opposed arm of said bridge circuit, a source of potential impressed on said bridge circuit, and a milli-ammeter connected across said bridge circuit.

5. In an apparatus for measuring the comparative tension of a contact spring and a standard gage spring during adjustment of the contact spring for tension comprising a bridge circuit completed through the spring under test and an associated contact and through the gage spring and associated contacts, means for repeatedly moving the gage spring into contact with the spring under test tending to open the contacts completed thereby, a source of potential applied to said bridge circuit, and a milli-ammeter for registering the direction of unbalance of the bridge circuit when one of said contacts opens.

6. A tension measuring apparatus comprising an oscillatable gage spring assembly, means for oscillating said assembly at a predetermined rate, a contact carrying arm having a contact thereon and carried by said assembly, the gage spring also carried by said assembly, and a contact thereon normally held against said other contact under a predetermined tension, a bridge circuit having equal resistance in each arm thereof and completed through said contacts, a source of power connected across two points of said bridge circuit, a meter connected across the other two points of said bridge circuit, and means for connecting a contact spring under test to complete one arm of said bridge circuit and to be engaged by said gage spring in its oscillation, said meter having a period of operation from zero to full scale deflection corresponding approximately to the period of oscillation of the oscillating means.

CHRISTIAN PAULSON.